(12) United States Patent
Ferman

(10) Patent No.: US 9,139,134 B2
(45) Date of Patent: Sep. 22, 2015

(54) VEHICLE MIRROR

(76) Inventor: Michael Ferman, Peakhurst (AU)

( * ) Notice: Subject to any disclaimer, the term of this patent is extended or adjusted under 35 U.S.C. 154(b) by 104 days.

(21) Appl. No.: 13/509,051

(22) PCT Filed: Nov. 12, 2010

(86) PCT No.: PCT/AU2010/001508
§ 371 (c)(1),
(2), (4) Date: Sep. 4, 2012

(87) PCT Pub. No.: WO2011/057338
PCT Pub. Date: May 19, 2011

(65) Prior Publication Data
US 2012/0320469 A1  Dec. 20, 2012

(30) Foreign Application Priority Data
Nov. 13, 2009  (AU) ................... 2009905538

(51) Int. Cl.
*B60R 1/06* (2006.01)
*B60R 1/066* (2006.01)
*G02B 7/182* (2006.01)
*B60R 1/062* (2006.01)

(52) U.S. Cl.
CPC ............... *B60R 1/0605* (2013.01); *B60R 1/062* (2013.01); *B60R 1/066* (2013.01); *G02B 7/182* (2013.01)

(58) Field of Classification Search
CPC .......... G02B 7/182; B60R 1/06; B60R 1/062; B60R 1/072; B60R 1/0605; B60R 1/066
USPC ........................................... 359/871, 872, 881
See application file for complete search history.

(56) References Cited

U.S. PATENT DOCUMENTS

| | | | |
|---|---|---|---|
| 3,712,715 A * | 1/1973 | Wagner ......................... 359/855 |
| 5,327,294 A * | 7/1994 | Koske et al. .................. 359/872 |
| 5,583,703 A | 12/1996 | Lang et al. |
| 5,604,644 A | 2/1997 | Lang et al. |
| 5,621,577 A | 4/1997 | Lang et al. |
| 5,781,353 A * | 7/1998 | Seubert et al. ................ 359/841 |
| 5,971,554 A | 10/1999 | Henion |
| 2006/0274443 A1 | 12/2006 | Lang et al. |

FOREIGN PATENT DOCUMENTS

| | | |
|---|---|---|
| DE | 3923932 A1 | 1/1991 |
| TW | 200900287 A | 1/2009 |

* cited by examiner

*Primary Examiner* — Ricky D Shafer
(74) *Attorney, Agent, or Firm* — Novak Druce Connolly Bove + Quigg LLP

(57) ABSTRACT

A vehicle mirror assembly has a mirror support and a mirror plate fitted on said support and a rear cover enclosing the sides and back of the mirror support and the attached plate. The rear cover is attachable to the mirror support and is able to be securely fastened to the mirror support by a screw threaded fastener accessed from the front of the mirror assembly without removal of the mirror plate. This solves the problem of maintaining the aerodynamic surface of the rear cover and yet having it securely fastened without the need to remove the mirror plate.

3 Claims, 3 Drawing Sheets

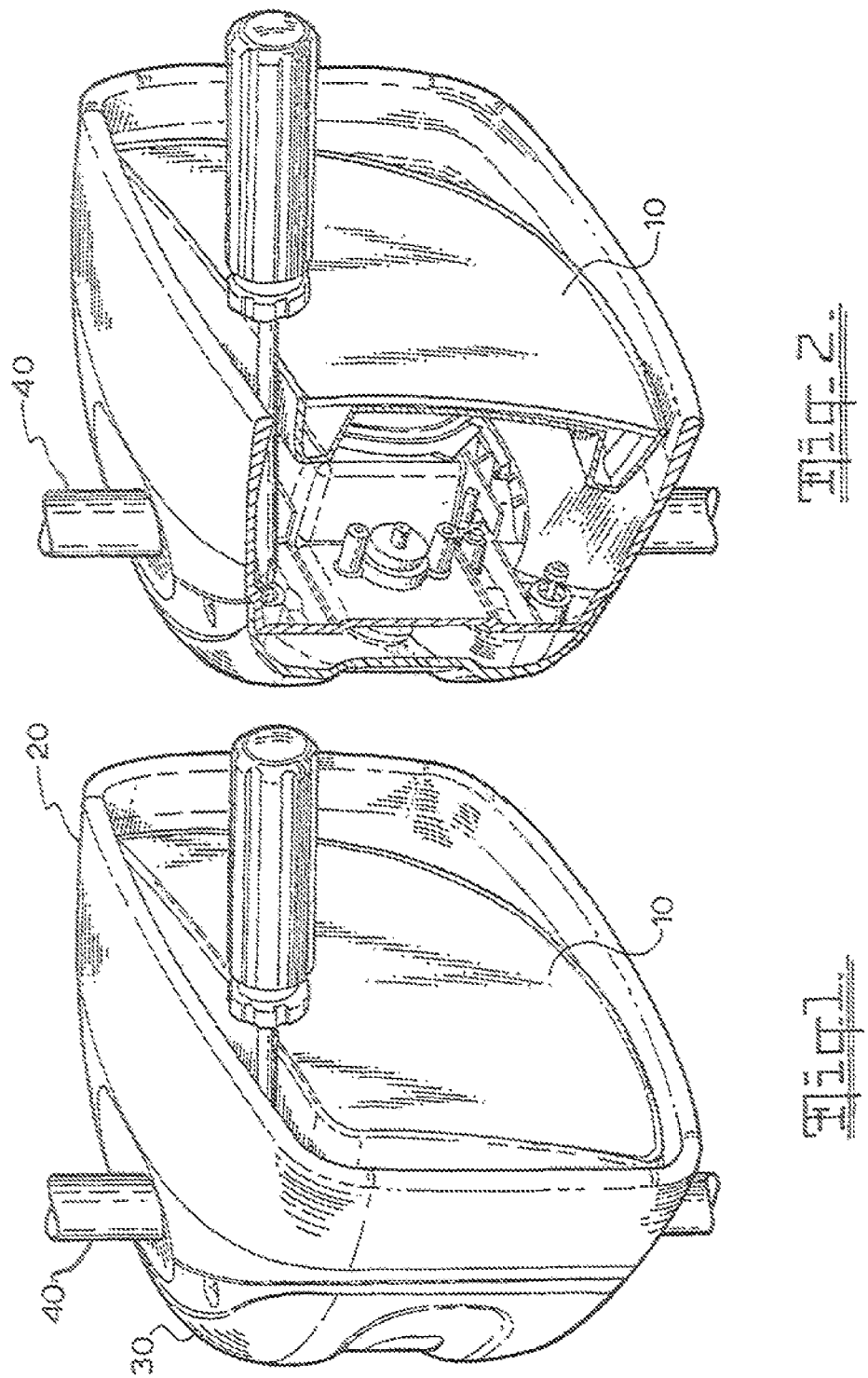

VEHICLE MIRROR

PRIORITY

Priority is claimed as a national stage application, under 35 U.S.C. §371, to PCT/AU2010/001508, filed Nov. 12, 2010, which claims priority to Australian Application No. 2009905538, filed Nov. 13, 2009. The disclosures of the aforementioned priority applications are incorporated herein by reference in their entirety.

This invention relates to improvements in external vehicle rear vision mirrors especially of the type used on trucks.

BACKGROUND TO THE INVENTION

External Mirrors need to have an aerodynamic rear surface and thus covers need to be smooth and preferably have no surface defects that may create wind noise.

U.S. Pat. No. 5,583,703 in FIG. 4 discloses fastening the rear cover by external screws. This creates an unsightly appearance and a non aerodynamic surface.

Most Mirror constructions overcome this problem by having covers that snap on or are clipped onto the mirror assembly. U.S. Pat. No. 5,621,577 is illustrative of this approach. These are not satisfactory because they can easily be dislodged if the mirror is struck.

U.S. Pat. No. 5,604,644 uses an internal screw for the cover which is accessed by removing the mirror plate.

It is an object of this invention to provide a more satisfactory means of securely fastening the rear cover to the mirror assembly.

BRIEF DESCRIPTION OF THE INVENTION

To this end the present invention provides a vehicle mirror assembly having a mirror support, a mirror plate fitted on said support and a rear cover enclosing the sides and back of the mirror support and attached plate where in the rear cover is attachable to the mirror support and is able to be securely fastened to the mirror support by a screw threaded fastener accessed from the front of the mirror assembly without removal of the mirror plate.

This arrangement makes use of the small clearance between the edge of the mirror plate and the side wall of the mirror body so that tilting of the mirror will expose a screw threaded fastener which attaches the cover to the mirror support. This can be fastened by a screw driver inserted in the gap. Preferably two or more fasteners are provided.

The screws are retained on the mirror support body by a washer or other suitable means and the cover is fitted to the mirror support and retained lightly by using a snap fitting. A secure attachment is then achieved by tightening the screw.

DETAILED DESCRIPTION OF THE INVENTION

A preferred embodiment will now be illustrated with reference to the drawings in which:

FIG. 1 illustrates the external appearance of the mirror of this invention;

FIG. 2 is an internal view of FIG. 1 with a side wall cut away;

Figure 4:
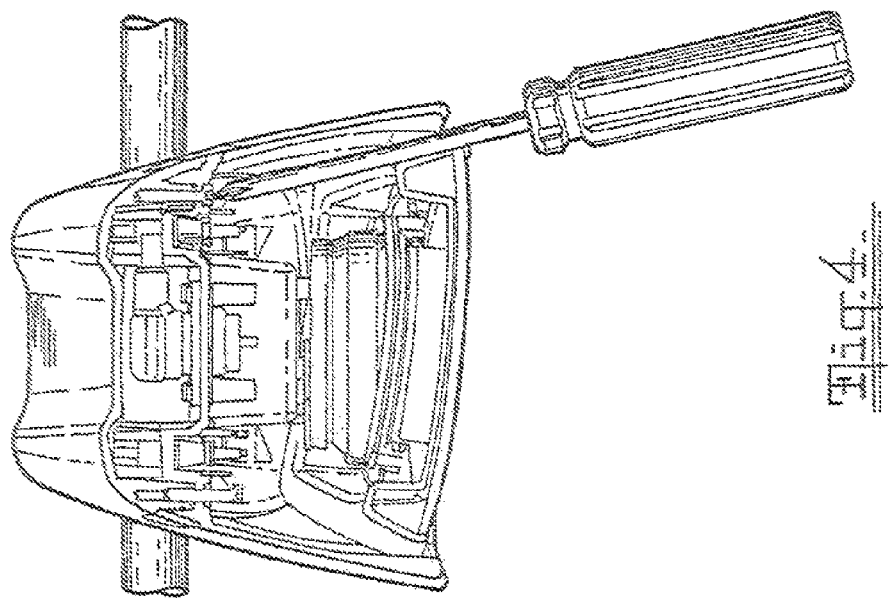
FIG. 4 is an end view of FIG. 1 with one fastener tightened.
Figure 3:
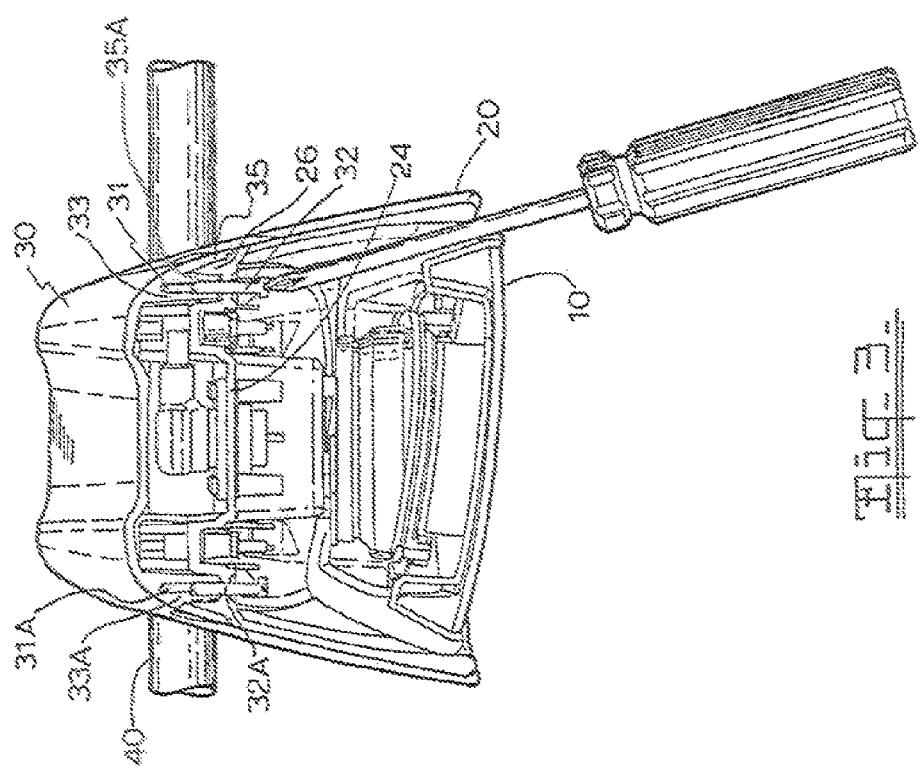
FIG. 3 is an end view of FIG. 1 with one fastener to be tightened.

The mirror assembly consists of a mirror plate 10 and the mirror support 20 with a rear cover 30. The rear cover 30 is attachable to the support 20 with the edge flanges 35 and 35A fitting over the location ribs 26 which lie adjacent the rear edge of support 20. A bracket pole 40 is shown protruding from the mirror support.

Figure 5:
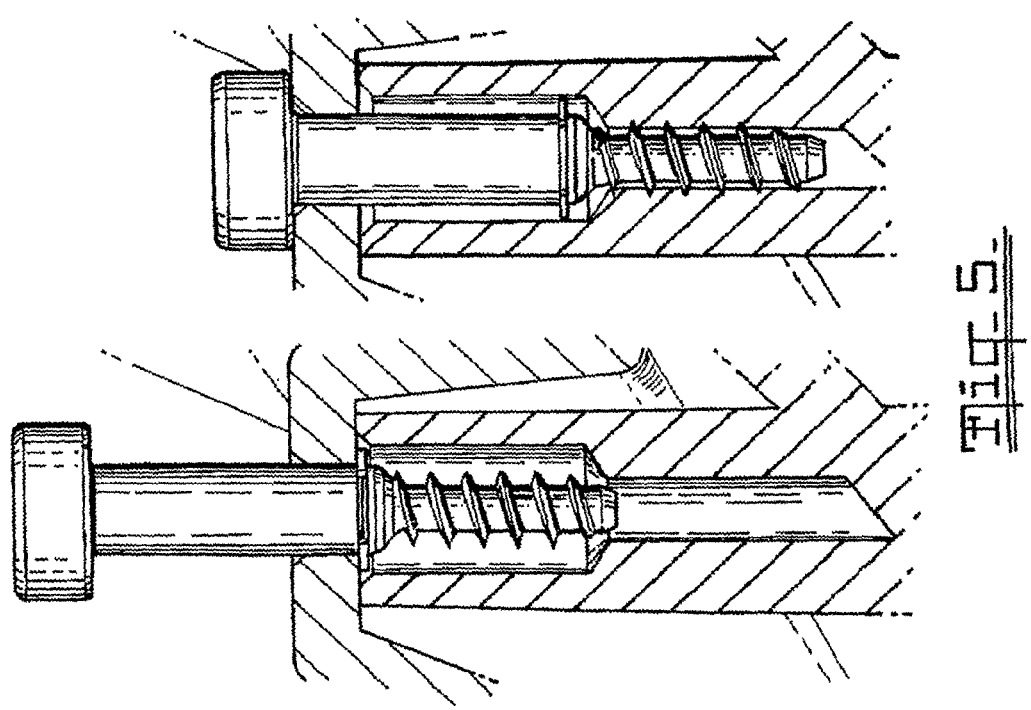
FIG. 5 is a detail of the screw used to fasten the cover.

The bosses 33 and 33A with the associated edge flanges 35 and 35A dorm a recess for the location rib 26. The bosses 33 and 33A contain an internally threaded recess 31 and 31 A adapted to receive a screw fastener 32, 32A. The screws 32 32A are captive screws as shown in FIG. 5 and are sized to ensure that the cover is firmly fastened to the mirror body. These fasteners 32, 32A are loosely retained on the base wall 24 of the mirror support 20 to ensure that they are not lost during assembly.

As can be seen from the above description the rear cover 30 has a smooth aerodynamic surface without any defects. Once the fasteners 32, 32A are tightened the rear cover cannot be dislodged. This invention makes use of the clearance between the edge of the mirror plate 10 and the internal wall of the support 20. This clearance is needed to allow adjustment of the mirror angle. By deflecting the mirror plate 10 to one side the screw 32 can be accessed and tightened.

Those skilled in the art will realise that this invention has solved a long standing problem of easily replacing and securely retaining an aerodynamic mirror rear cover without having to remove the mirror. Those skilled in the art will also realise that this invention can be implemented in embodiments other than those described without departing from the core teachings of this invention.

The invention claimed is:

1. A vehicle mirror assembly comprising a mirror support, a mirror plate fitted on said support, a rear cover enclosing the sides and back of the mirror support and said mirror plate and a clearance between an edge of the mirror plate and an internal wall of the mirror support, wherein the mirror plate is fixed on the mirror support and is housed within said mirror support and wherein the rear cover has a smooth aerodynamic surface without any defects, is directly attached to the mirror support and is configured to be securely fastened to the mirror support by a screw threaded fastener accessed from the front of the mirror assembly without removal of the mirror plate by provision of said clearance between the edge of the mirror plate and an internal wall of the mirror support and wherein attachment by the screw threaded fastener avoids dislodgment of the rear cover due to the vehicle mirror being struck.

2. The vehicle mirror assembly according to claim 1, wherein the vehicle mirror assembly is tiltable to thereby expose the screw threaded fastener.

3. The vehicle mirror assembly according to claim 1, which further comprises a bracket pole protruding from the mirror support.

* * * * *